June 4, 1929. C. F. M. VAN BERKEL 1,716,158
SLICING MACHINE
Filed May 15, 1924 7 Sheets-Sheet 3

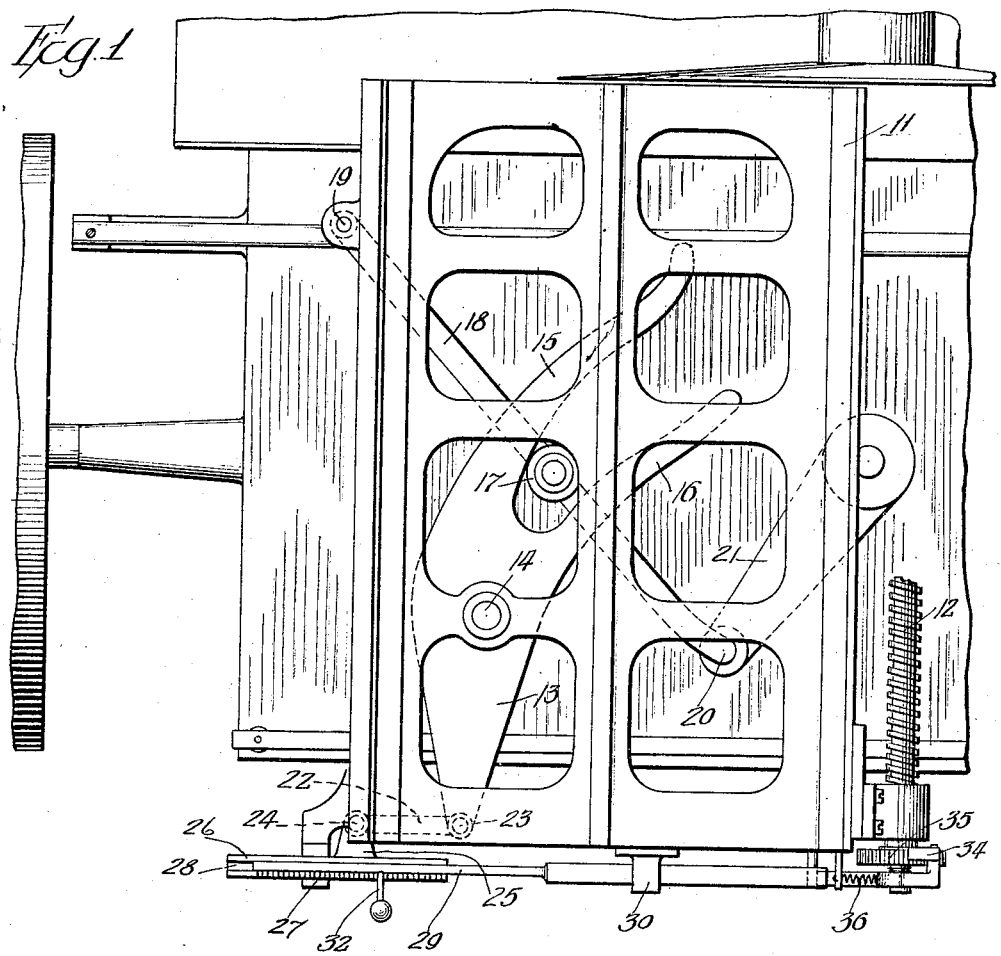
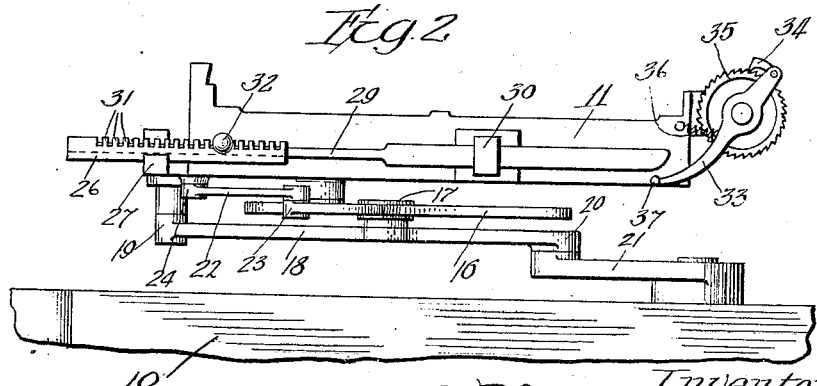

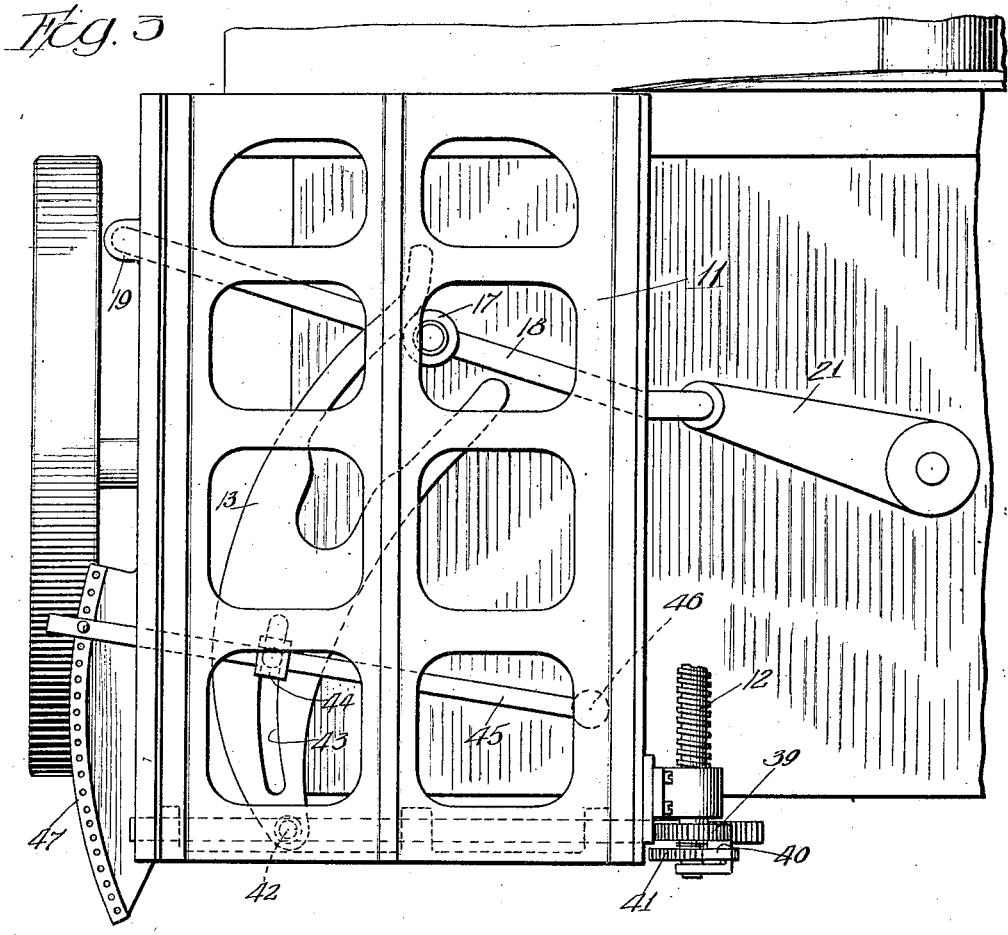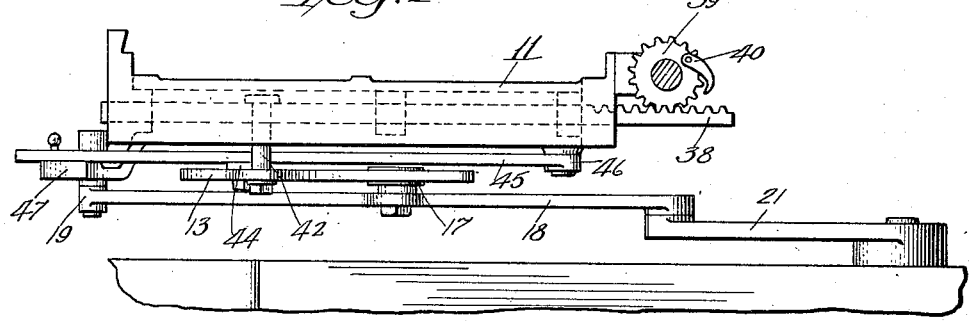

Inventor:
C. F. M. van Berkel
By Nissen & Crane Attys.

June 4, 1929.  C. F. M. VAN BERKEL  1,716,158
SLICING MACHINE
Filed May 15, 1924  7 Sheets-Sheet 4

Inventor:
C. F. M. van Berkel
By Nissen & Crane Attys.

June 4, 1929.  C. F. M. VAN BERKEL  1,716,158
SLICING MACHINE
Filed May 15, 1924   7 Sheets-Sheet 5

Inventor:
C. F. M. van Berkel
By Nissen & Crane Attys.

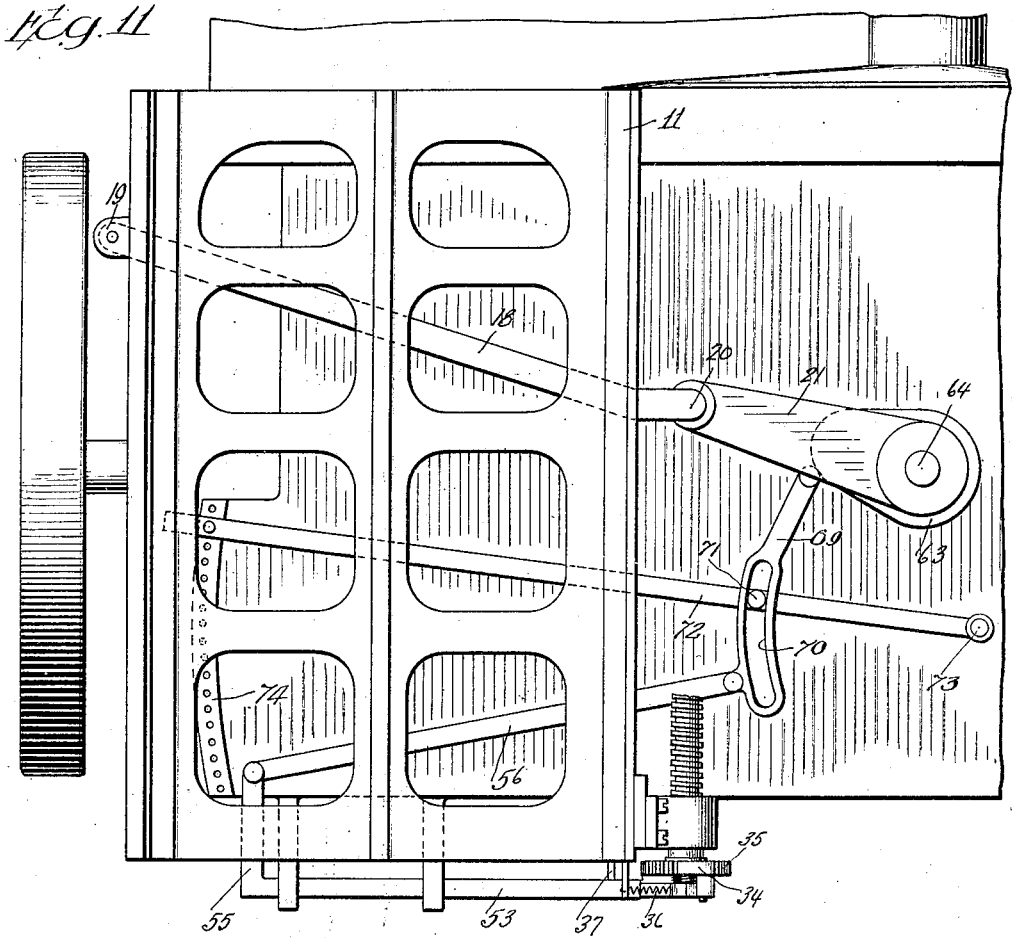
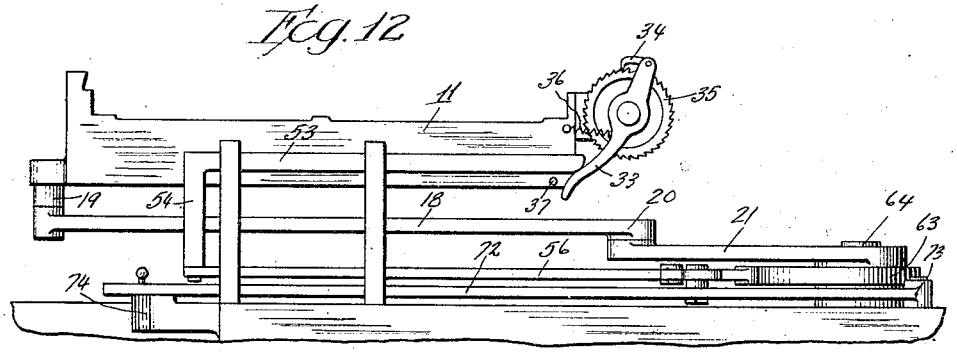

Patented June 4, 1929.

UNITED STATES PATENT OFFICE.

1,716,158

CORNELIS FRANCISCUS MARIA van BERKEL, OF ROTTERDAM, NETHERLANDS, ASSIGNOR TO U. S. SLICING MACHINE COMPANY, OF LA PORTE, INDIANA, A CORPORATION OF INDIANA.

SLICING MACHINE.

Application filed May 15, 1924, Serial No. 713,395, and in the Netherlands July 30, 1923.

This invention relates to feeding mechanism for the work table of slicing machines and has for its object the provision of such mechanism in which adjustment to vary the thickness of slices is provided between the driving member and the pawl and ratchet mechanism, thus avoiding the necessity of an adjustable device for controlling the operation of the pawl.

A further object is to provide feeding mechanism which shall be of improved construction and operation.

The invention is exemplified in the combination and arrangement of parts shown in the accompanying drawings and described in the following specification, and it is more particularly pointed out in the appended claims.

In the drawings—

Fig. 1 is a fragmentary top plan view of a portion of a slicing machine embodying one form of the present invention;

Fig. 2 is a fragmentary elevation of the mechanism shown in Fig. 1;

Figs. 3 and 4 are similar to Figs. 1 and 2 showing a modification of the invention;

Figs. 11 and 12 are similar views showing another modification; and

Figure 5:
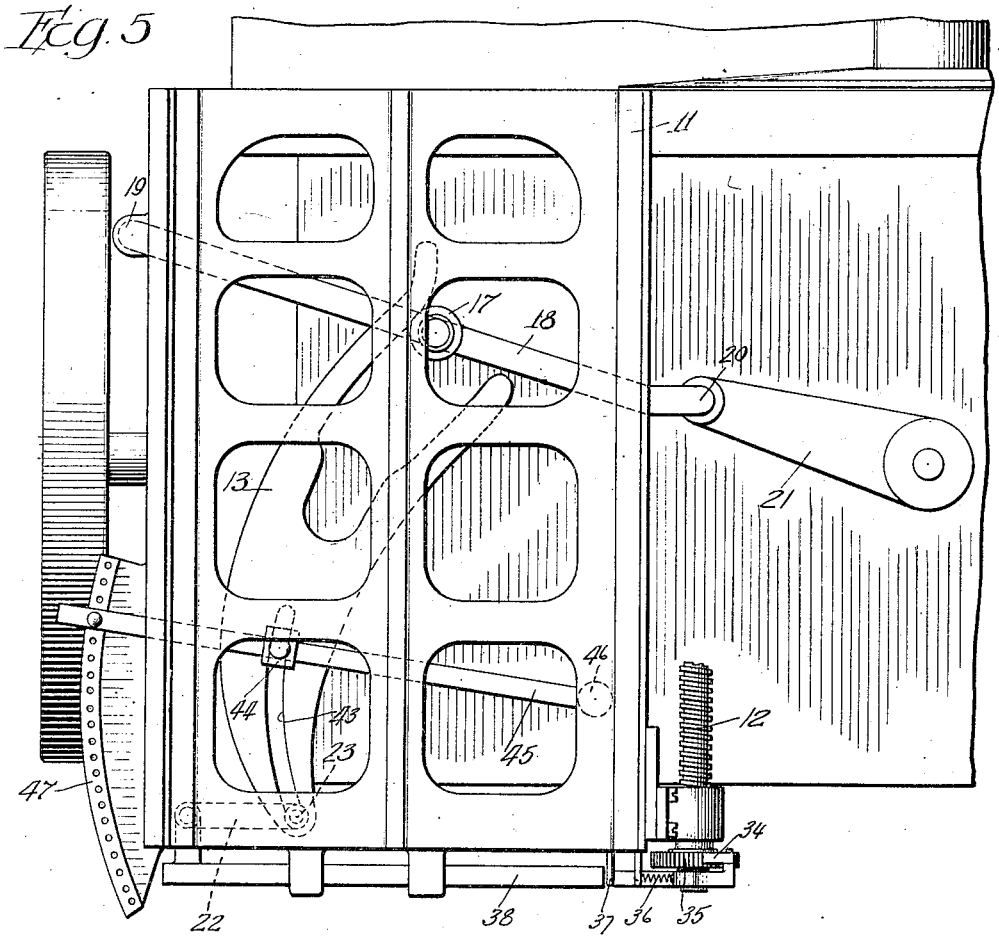
Figs. 5 and 6 are similar views showing another modification.

The invention is an improvement on the mechanism for feeding the work table in slicing machines of the nature shown in Patent No. 920,506, granted to W. A. van Berkel, May 4, 1919. In machines of this nature it is customary to intermittently feed the work supporting table toward the plane of the slicing knife by a screw provided with pawl and ratchet mechanism. In the patent referred to the pawl is given a definite movement, but its action on the ratchet is variably controlled by a guard or shroud for the ratchet teeth. The present improvement makes it unnecessary to provide this variable control for the pawl, but an adjustable connection is provided by means of which the pawl itself is operated varying distances depending on the thickness of the slice desired.

In the embodiment shown in Figs. 1 and 2, the numeral 10 designates the base frame having a reciprocating carriage 11 mounted thereon provided with ways on which the meat plate, not shown, is mounted to slide. The meat plate is fed forward by the screw 12 in the manner common in the art and shown in the patent referred to above. In each of the forms of the invention shown, a member driven by the carriage reciprocating mechanism is provided and it is through this member, which may be termed a feed driving cam, that the feeding mechanism is actuated. As shown in Fig. 1, this feed driving cam comprises a cam plate 13 pivotally mounted at 14 to the under face of the carriage 11 and is provided with a pair of cam fingers 15 and 16 which engage a roller 17 mounted on a link 18. The link 18 is pivoted at 19 to the carriage 11 and at 20 to the crank arm 21 which is rotated by the main drive shaft of the slicing machine. The plate 13 has a link 22 pivoted at 23 thereto, the opposite end of the link being pivotally connected at 24 to a lug 25 secured to a slide bar 26. The bar 26 is slidably mounted in a bracket 27 and is provided with a groove 28 for receiving a rod 29. The rod 29 is slidably mounted in a head 30 which is pivotally supported on the carriage 11.

A series of teeth 31 are arranged to receive a pin 32 secured to the end of the rod 29 by means of which the rod and slide bar are adjustably connected to one another. Rotation of the crank arm 21 reciprocates the carriage 11 and at the same time oscillates the plate 13 about its pivot 14. The movement of the plate imparts a longitudinal reciprocation to the bar 29 so that the end of the bar periodically strikes a lever 33 journaled on the end of the screw 12. The opposite end of the lever 33 is provided with a pawl 34 which engages the teeth of a ratchet wheel 35 to rotate the screw 12. A suitable spring 36 is provided for normally rotating the lever 33 in a clockwise direction, as viewed in Fig. 2, the rotation of the lever in that direction being limited by a stop 37. When the bar 29 is moved to the right in that figure it strikes the lever 33 and imparts a limited rotation thereto against the tension of the spring 36, thus moving the screw 12 to feed the meat plate toward the slicing knife. If a small movement is desired the bar 29 is adjusted to the left in the teeth 31 so that it strikes the lever 33 only at the end of its movement. Adjustment of the bar to the right causes it to contact with the lever 33 at an earlier period in its reciprocation and thus imparts greater movement to the lever. The provision of the adjustment by means of the teeth 31 between the pawl and ratchet mechanism and the operating part therefor makes it unnecessary to provide a governing guard or cam for the operating pawl and permits the pawl to engage the ratchet teeth throughout its entire range of movement.

In the embodiment shown in Figs. 3 and 4, a rack bar 38 meshes with a pinion 39 loosely journaled on the screw 12 and a pawl 40 is connected with the pinion 39 and meshes with the teeth of the ratchet wheel 41 providing a one-way drive from the pinion 39 to the screw 12. The cam plate 13 is pivoted at 42 to the rack bar 38 and is provided with a slot 43 which pivotally engages a slide block 44 mounted on a rod 45. The rod 45 is pivoted at 46 to the carriage 11 and is adjustably connected to a segment 47 by means of which the block 44 may be held in adjusted positions in the slot 43. By shifting the rod 45 along the segment 47 the position of the fulcrum is varied so as to vary the amplitude of the movement of the rack bar 38 and thus change the extent of rotation of the screw 12.

Figure 6:
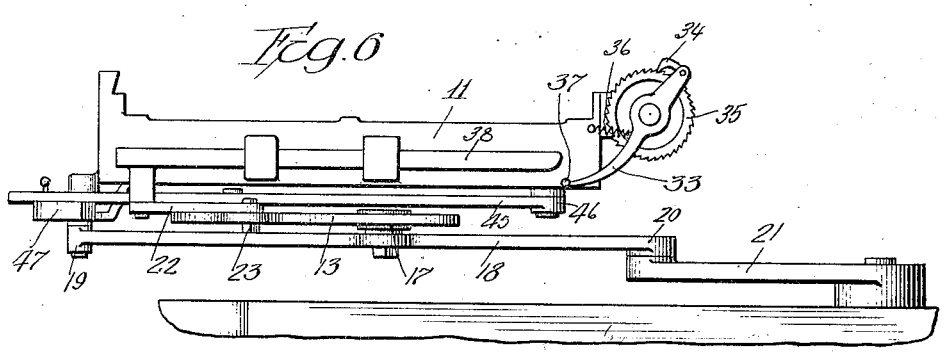

The embodiment shown in Figs. 5 and 6 is similar to that shown in Figs. 3 and 4, but the rack and pinion connection with the feed screw is replaced by a ratchet lever similar to that shown in Figs. 1 and 2.

Figure 7:
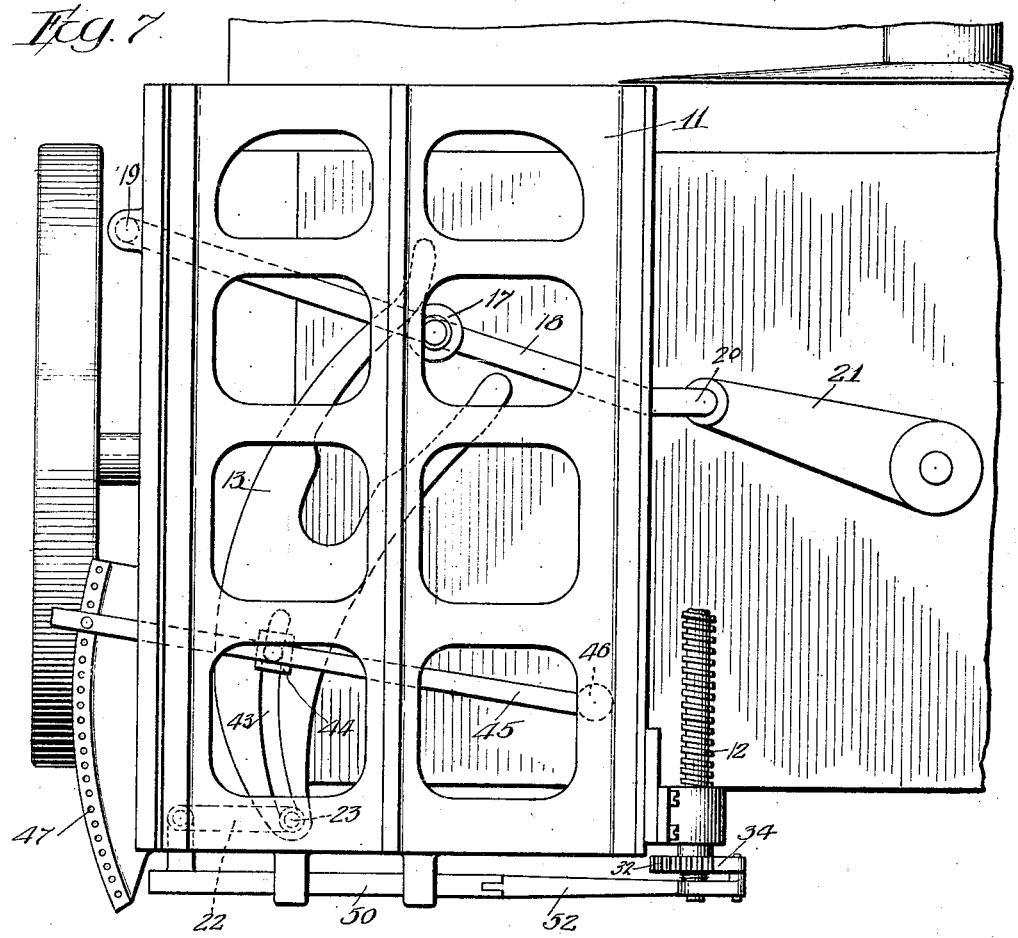
Figs. 7 and 8 are similar views showing another modification.
Figure 8:
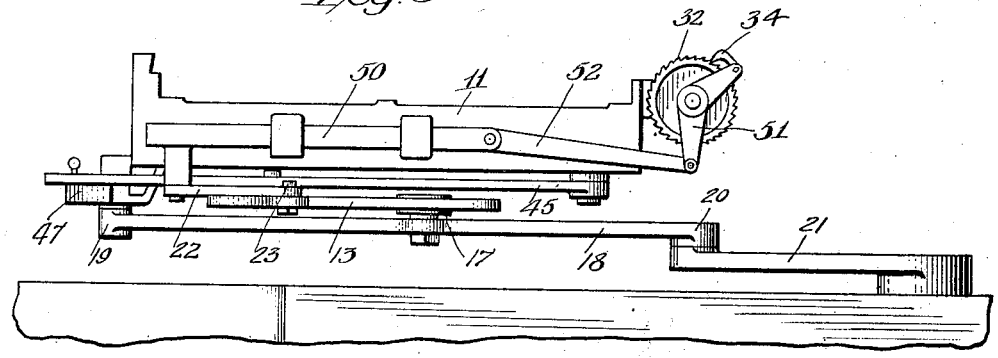

The form of the invention shown in Figs. 7 and 8 is similar to that shown in Figs. 5 and 6, except that the slide bar 50 is connected to the lever 51 which operates the pawl 34 by means of a connecting rod 52 which forms a permanent connection between the bar 50 and the lever 51.

Figure 9:
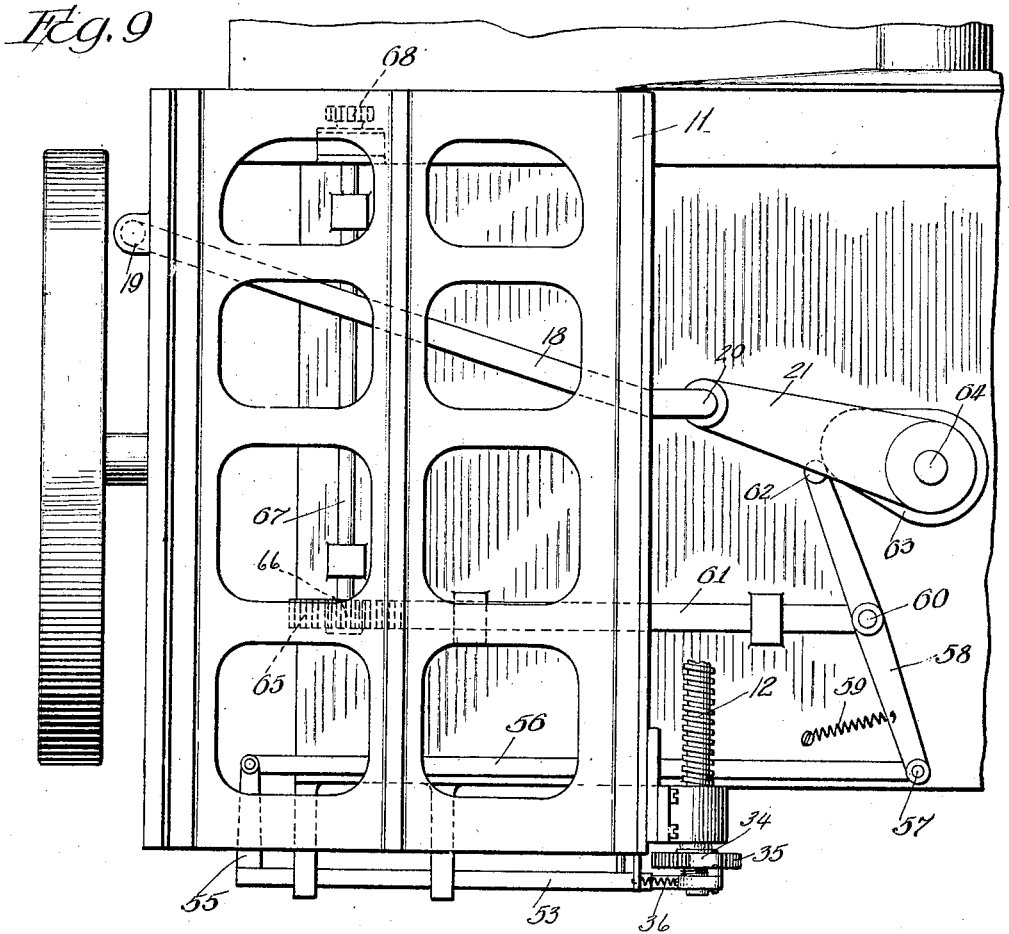
Figs. 9 and 10 are similar views showing another modification.
Figure 10:
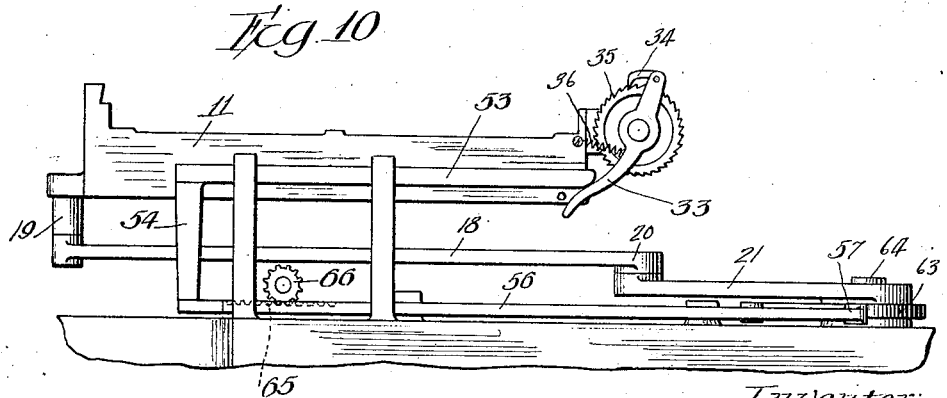

In the embodiment shown in Figs. 9 and 10 a slide rod 53 is provided for operating the ratchet lever 33 and the bar 53 is connected by means of frame members 54 and 55 with a link 56 which is pivotally connected at 57 to a lever arm 58. The arm 58 is normally drawn by a spring 59 in a clockwise direction, as viewed in Fig. 9, about a pivotal connection 60 with a slide bar 61. The end of the arm 58 opposite the pivot 57 is provided with a cam roller 62 which engages a cam 63 on the vertical shaft 64 to which the crank arm 21 is attached. The slide bar 61 is provided with a rack 65 meshing with a pinion 66 secured to the end of a shaft 67. The opposite end of the shaft 67 is provided with a hand-wheel 68 and suitable index mechanism by which the slide 61 may be moved longitudinally. This will shift the fulcrum 60 for the lever 62 and thus vary the action of the bar 53 on the ratchet mechanism for rotating the shaft 12.

The embodiment shown in Figs. 11 and 12 is similar to that shown in Figs. 9 and 10, but as shown in Fig. 11, a curved lever 69 is provided having a slot 70 for receiving a movable fulcrum 71. The fulcrum 71 is carried on a lever 72 pivoted at 73 to the base frame and having an adjustable connection with a segment 74 by means of which the fulcrum is held in adjusted positions. In other respects the construction is similar to that shown in Figs. 9 and 10, but the fulcrum is shifted about the pivotal point 73 instead of in a straight line as in the construction previously described.

Figure 13:
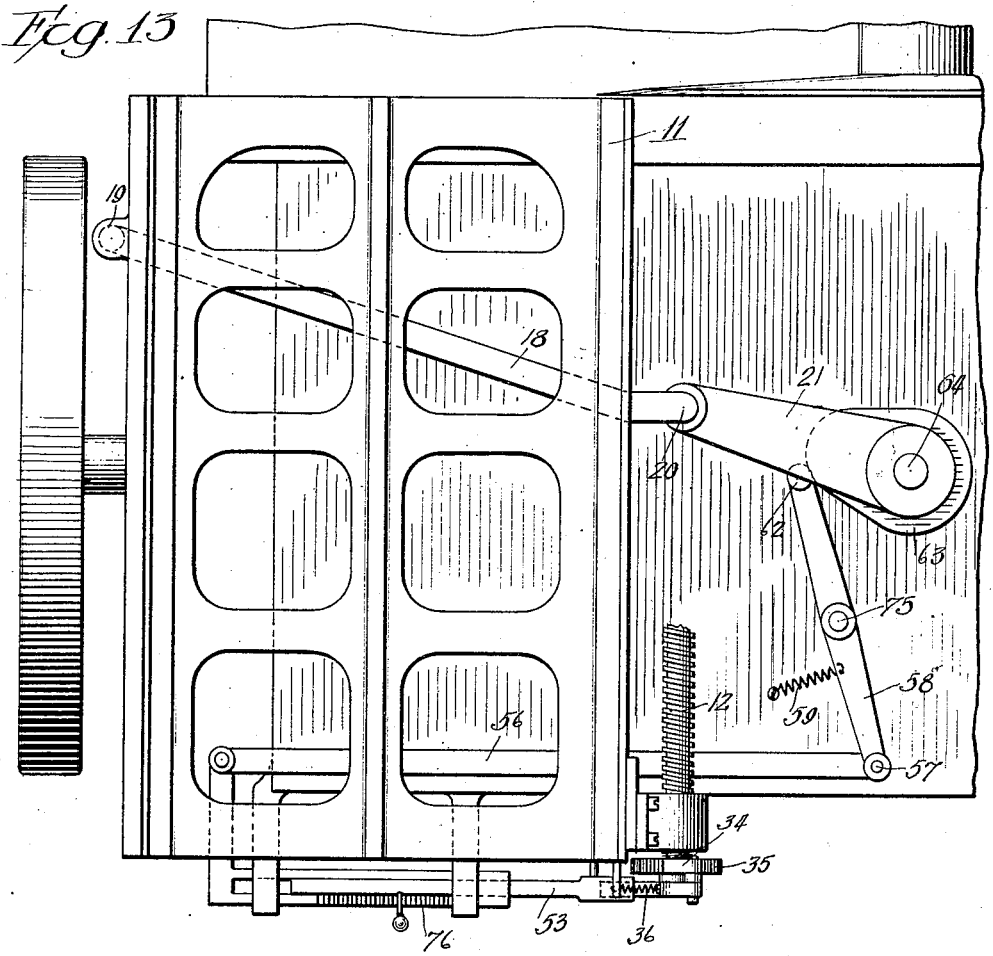
Figs. 13 and 14 are similar views showing another modification.
Figure 14:
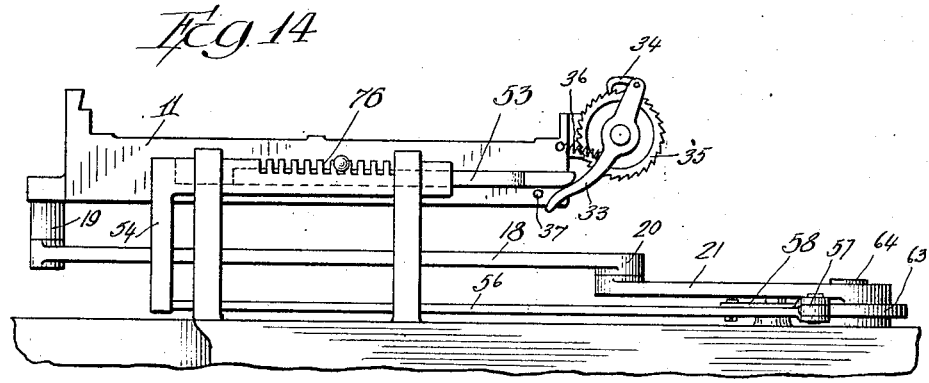

The form of the invention shown in Figs. 13 and 14 is similar to that shown in Figs. 9 and 10, but the lever 58 is provided with a fixed fulcrum 75 and the bar 53 is provided with an adjustable connection 76 similar to that shown in Fig. 1.

As pointed out in all of the embodiments described, the feeding is accomplished by the backward and forward motion of the carriage and the adjustment for the feeding mechanism is interposed between the main drive for the machine and the feeding pawl, and the regulating cam for the pawl is omitted. From the described constructions it will be manifest that this variability may be accomplished by several methods and the invention is therefore not limited to a certain form of construction.

I claim:

1. A slicing machine comprising a reciprocating table, driving mechanism for operating said slicing machine, said driving mechanism including means for reciprocating said table, a feed driving cam operated by said table reciprocating means, an intermittent feed device, and an adjustable connection between said feed driving cam and feed device for imparting variable motion to said feed device.

2. The combination with a slicing machine having a reciprocating carriage, of an intermittent feed device mounted on said carriage, means for reciprocating said carriage, a feed driving cam operated by said reciprocating means, and adjustable means for transmitting motion from said feed driving cam to said feed device.

3. In a slicing machine, a reciprocating carriage, means for reciprocating said carriage, a feed driving cam operated by said table reciprocating means, an intermittent feed device mounted on said carriage and comprising a reciprocating member and a one-way drive operated by said member, and adjustable means actuated by said feed driving cam for imparting variable movement to said reciprocating member.

4. A slicing machine comprising a reciprocating carriage, driving means for operating said carriage, a feed driving cam operated by said driving means, an intermittent feed device mounted on said carriage and comprising a reciprocating member and a one-way drive actuated thereby, and a driving connection between said feed driving cam and reciprocating member, said connection being adjustable to impart variable movement to said reciprocating member.

5. In a slicing machine, a main drive, a reciprocating table, means actuated by said drive for reciprocating said table, a one-way feed device, a reciprocating member for actuating said feed device, a feed driving cam operated by said table reciprocating means, and means operated by said feed driving cam for imparting movement to said reciprocating member, said second mentioned means being adjustable to vary the movement imparted to said reciprocating member.

6. In a slicing machine, a reciprocating carriage, a crank for actuating said carriage, a cam plate pivoted on said carriage, a connecting bar between said crank and carriage, a cam roller on said bar for actuating said cam plate, a feed screw mounted on said carriage, a ratchet wheel on said feed screw, a pawl for driving said ratchet wheel, a reciprocating member carrying said pawl, and a driving connection operated by said cam plate for actuating said reciprocating member, said connection being adjustable to vary the movement imparted to said reciprocating member.

7. In a slicing machine, a main drive, a reciprocating carriage, means connecting said drive and carriage, a feed screw mounted on said carriage, pawl and ratchet mechanism for rotating said feed screw, and means operated by said main drive for actuating said pawl and ratchet mechanism, said actuating means being adjustable to impart variable movement to said pawl and ratchet mechanism.

8. In a slicing machine, a reciprocating table, driving means for said table, a feed driving cam operated by said driving means, intermittently operated feed mechanism, a lever for transmitting movement from said feed driving cam to said feed mechanism, and means for shifting the fulcrum of said lever to vary the amount of movement of said feed mechanism.

In testimony whereof I have signed my name to this specification on this sixteenth day of April, 1924.

CORNELIS FRANCISCUS MARIA van BERKEL.